(12) United States Patent
Samuel

(10) Patent No.: US 10,783,726 B1
(45) Date of Patent: Sep. 22, 2020

(54) SMART COMPARTMENT FOR VEHICLES

(71) Applicant: Gayna Samuel, Brooklyn, NY (US)

(72) Inventor: Gayna Samuel, Brooklyn, NY (US)

( * ) Notice: Subject to any disclaimer, the term of this patent is extended or adjusted under 35 U.S.C. 154(b) by 0 days.

(21) Appl. No.: 16/725,171

(22) Filed: Dec. 23, 2019

Related U.S. Application Data

(63) Continuation-in-part of application No. 29/714,585, filed on Nov. 25, 2019.

(51) Int. Cl.
| | | |
|---|---|---|
| B60R 7/06 | (2006.01) | |
| E05B 83/28 | (2014.01) | |
| G07C 9/00 | (2020.01) | |
| B60R 11/00 | (2006.01) | |
| B60R 7/08 | (2006.01) | |

(52) U.S. Cl.
CPC ............ *G07C 9/00563* (2013.01); *B60R 7/06* (2013.01); *B60R 7/087* (2013.01); *B60R 2011/0005* (2013.01); *E05B 83/28* (2013.01)

(58) Field of Classification Search
CPC ... B60R 7/06; B60R 7/087; B60R 2011/0005; B60R 2011/001; E05B 83/28; E05B 83/30; E05B 83/32; G07C 9/00563; E05G 1/005
USPC ........................... 224/483, 277, 569; D3/294
See application file for complete search history.

(56) References Cited

U.S. PATENT DOCUMENTS

| | | | | |
|---|---|---|---|---|
| 2,931,489 A | * | 4/1960 | Farnholtz | B60N 3/002 224/277 |
| 4,105,246 A | * | 8/1978 | Trumbull | B60J 3/00 296/97.7 |
| 4,619,386 A | * | 10/1986 | Richardson | B60R 7/06 108/44 |
| 4,846,382 A | * | 7/1989 | Foultner | B60R 11/00 224/483 |
| 6,260,300 B1 | * | 7/2001 | Klebes | F41A 17/066 206/317 |
| 6,672,622 B2 | * | 1/2004 | Barron | B42D 5/005 224/277 |
| 6,854,778 B2 | * | 2/2005 | Lee | B60N 3/002 296/37.12 |
| 7,143,913 B2 | * | 12/2006 | Lindsey | B62J 11/00 224/413 |
| 7,240,941 B2 | * | 7/2007 | Adams | B60R 7/06 296/37.1 |
| D741,598 S | * | 10/2015 | Calero | D3/303 |
| 9,530,266 B2 | * | 12/2016 | Delattre | E05G 1/005 |
| 10,233,687 B2 | * | 3/2019 | Delattre | E05G 1/005 |
| 10,253,529 B1 | * | 4/2019 | McGinn | E05G 1/04 |

(Continued)

*Primary Examiner* — Justin M Larson

(57) ABSTRACT

The present invention is a secure document compartment that can hold important vehicle documents, and is conveniently placed proximate to a user, so that the user may retrieve the documents in a fast and secure fashion. According to the present invention, the user may actuate opening of the secure document compartment manually with the help of an access panel or by voice activation. Further, the present invention may be visible and attached to an upper dashboard of the vehicle, right behind the steering wheel for easy retrieval of documents, or, may be installed inside, as an invisible compartment inside the dashboard. Furthermore, the present invention may comprise a camera, a microphone, and necessary circuitry that enables the secure document compartment to have multiple smart functionalities, such as audio/video recording and play back, remote wireless operations etc.

14 Claims, 7 Drawing Sheets

(56) References Cited

U.S. PATENT DOCUMENTS

| | | | |
|---|---|---|---|
| 2010/0171020 A1* | 7/2010 | Canino | B60R 11/00 |
| | | | 248/346.03 |
| 2011/0203328 A1* | 8/2011 | Vilkomirski | B25H 3/02 |
| | | | 70/57.1 |
| 2017/0046899 A1* | 2/2017 | Delattre | E05G 1/04 |
| 2018/0070753 A1* | 3/2018 | Eveloff | H04W 12/0804 |
| 2018/0118122 A1* | 5/2018 | Rueda Musi | E05B 85/06 |
| 2019/0069731 A1* | 3/2019 | Arnold | B65D 83/0894 |
| 2019/0210538 A1* | 7/2019 | Adrain | B60R 7/05 |
| 2019/0211607 A1* | 7/2019 | Delattre | G07C 9/00912 |
| 2019/0266824 A1* | 8/2019 | Jeruchim | G07C 9/00309 |

* cited by examiner

SMART COMPARTMENT FOR VEHICLES

FIELD OF THE INVENTION

The present invention relates generally to a secure document compartment for vehicles. More specifically, the present invention relates to an apparatus in the shape of a police badge, suitable for containing any important vehicle documents such as registration, insurance, driver's license etc., wherein a user may actuate opening of the secure document compartment manually with the help of an access panel or by voice activation, to retrieve the important documents.

BACKGROUND OF THE INVENTION

Vehicle registration, proof of insurance and a driver's license are three important documents that a person should carry any time they are in a car. All these documents may be requested if you are in an accident or if you get pulled over for some reason. Depending on the situation, and the place where you are using the vehicle, there might be other important documents that are needed as well, such as permits, emission test document, title document etc. Often times, people forget to carry them in the vehicle, or they would just keep them in the glove compartment or in their handbags. A glove compartment may contain many other things and in situations where you get pulled over by a cop, or in any other situation where you need to retrieve these important documents fast, it gets really difficult to find/get them from the glove compartment and/or handbags/wallets. Further, the contents in other compartments which are used to store documents are not completely visible to the officer and can cause false assumptions possibly leading to fatal mistakes based on what could be inside these larger compartments and/or what is being retrieved from them during the traffic stop.

An objective of the present invention is to provide users with a safe and secure document compartment that can hold important documents of a car, wherein, the document compartment is conveniently placed proximate to a driver, so that the driver may retrieve the documents in a fast and secure fashion. According to the present invention, the user may actuate opening of the secure document compartment manually with the help of an access panel or by voice activation. Further, the present invention may be visible and attached to an upper dashboard of the vehicle, right behind the steering wheel, for easy retrieval of documents, or may be installed inside, as an invisible compartment inside the dashboard. Furthermore, the present invention may comprise a camera, a microphone, and necessary circuitry that enables the secure document compartment to have multiple smart functionalities, such as audio/video recording and play back, remote wireless operations etc. Thus, the present invention enables users to have a smart compartment that can hold important documents, easily retrieve the stored documents, as well as perform various smart security operations.

DETAIL DESCRIPTIONS OF THE INVENTION

Figure 1:
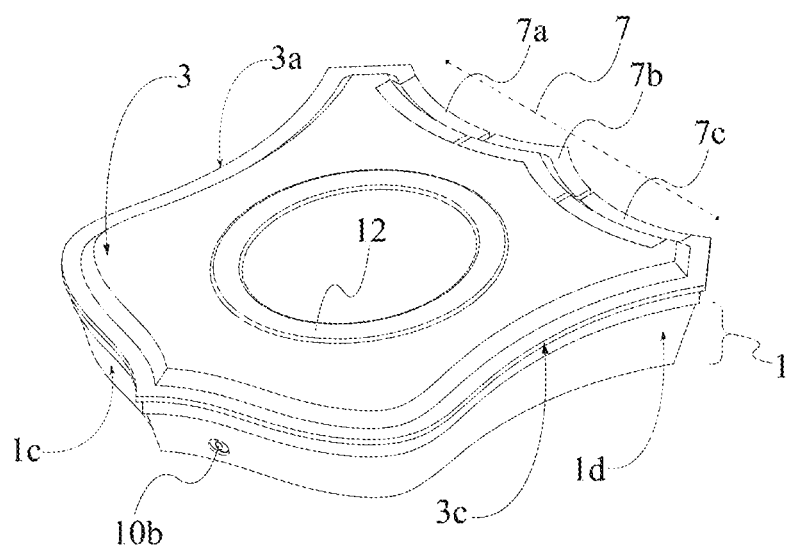
FIG. 1 is a top-front-left perspective view of the present invention.
Figure 2:
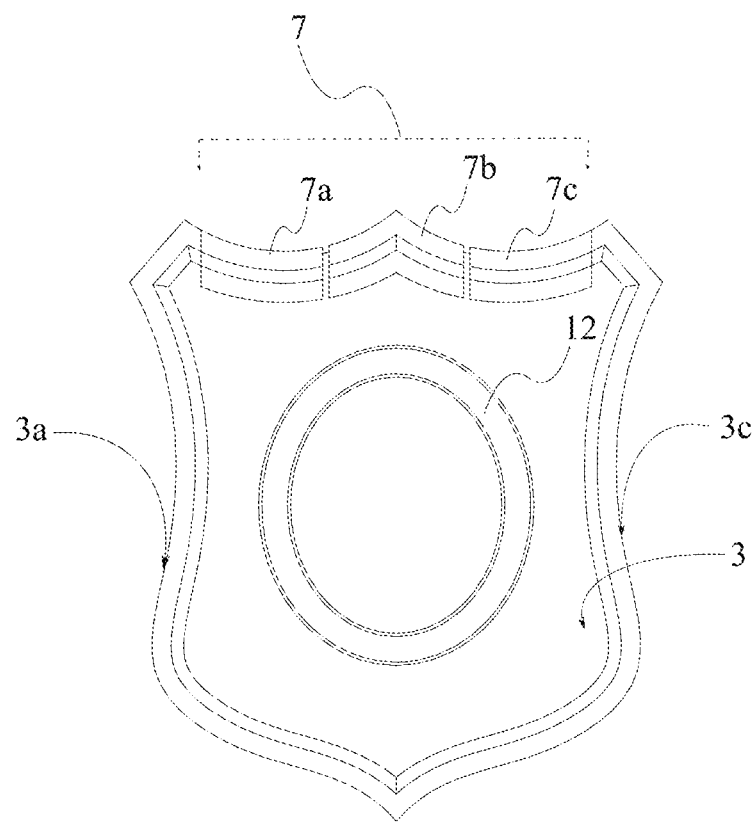
FIG. 2 is a top plan view of the present invention.
Figure 3:
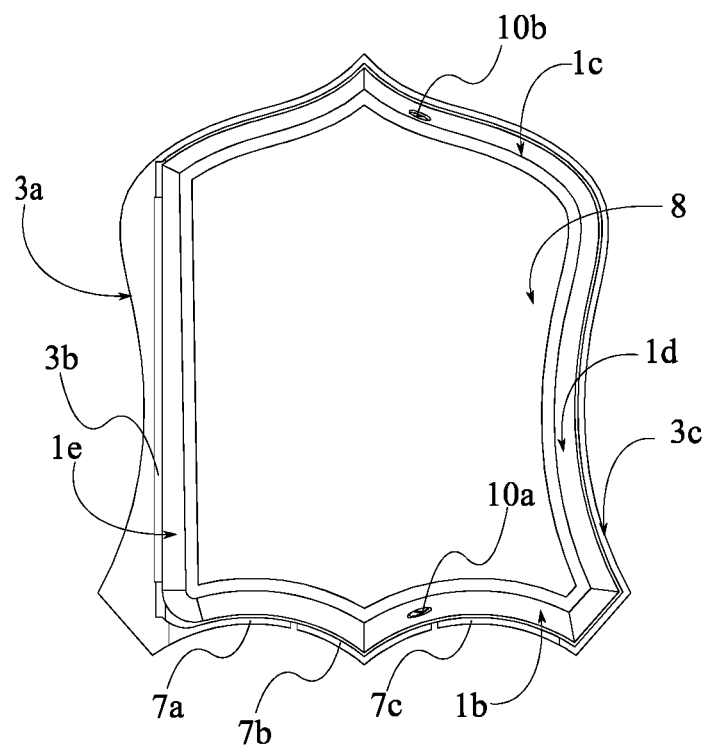
FIG. 3 is a bottom plan view of the present invention.
Figure 4:
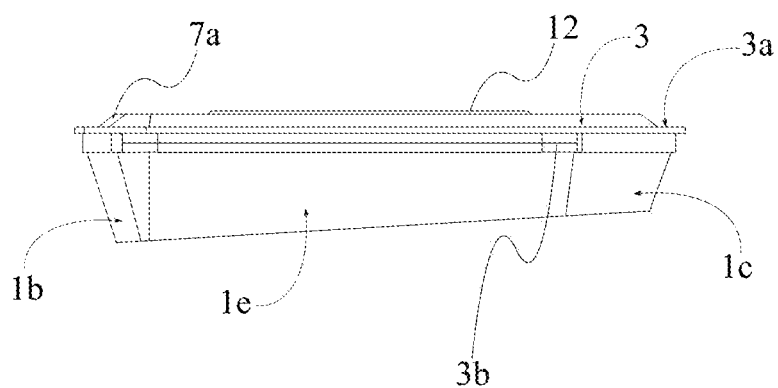
FIG. 4 is a right-side elevational view of the present invention.

All illustrations of the drawings are for the purpose of describing selected versions of the present invention and are not intended to limit the scope of the present invention.

In reference to FIG. 1 through FIG. 7, the present invention is a smart compartment. An objective of the smart compartment is to provide users with a safe and secure document compartment that can hold important documents, wherein the secure document compartment is conveniently placed, so that a user may retrieve the documents in a fast and secure fashion. According to the present invention, the user may actuate opening of the smart compartment manually with the help of an access panel or by voice activation. Further, the smart compartment may be visible and attached to an upper dashboard of the vehicle, right behind the steering wheel, for easy retrieval of documents. This enables officers to clearly see what is inside the compartment and removes any ambiguity regarding the contents of the compartment/the action of the driver while trying to retrieve the documents. However, the smart compartment may also be installed inside, as an invisible compartment inside the dashboard, with just the upper cover of the smart compartment being visible outside. Furthermore, the present invention may comprise a camera, a microphone, and necessary circuitry that enables the secure document compartment to have multiple smart functionalities, such as audio/video recording and play back, remote wireless operations etc. Thus, the smart compartment can store important documents, easily retrieve the stored important documents, and perform various smart security operations.

The following description is in reference to FIG. 1 through FIG. 7. It is an aim of the smart compartment, to enable users to hold and retrieve important documents inside a vehicle, in a fast and secure way, with the help of modern technology. In order to accomplish this, the smart compartment comprises, a base receptacle 1, an inner cavity 2, a cover 3, a latch 4, an actuation system 5, a microcontroller 6, and a human interface device (HID) 7. As seen in FIG. 1 through FIG. 7, the base receptacle 1 constitutes the primary casing that holds the important documents and all the other necessary electric/electronic circuitry of the present invention. The inner cavity 2, forms the space that holds the important documents, the cover 3 provides a protective closure for the base receptacle 1, and the latch 4 securely connects and disconnects the cover 3 to the base receptacle 1. The actuation system 5 activates the latch 4 based on the actuation process utilized, and the microcontroller 6 is a processing device that manages the operation of the electrical components within the present invention. Finally, the human interface device (HID) 7, forms the platform for user interaction in order to perform the various operations of the present invention.

As seen in FIG. 1 through FIG. 7, the inner cavity 2 traverse into the base receptacle 1. Further, a first end 3a of the cover 3 is hingedly connected to a rim 1a of the base receptacle 1, with the help of a hinge 3b. As a result, the user is able to store documents within the base receptacle land seal or open the cover by actuating the hinge 3b. Although a normal hinge 3b is depicted in FIG. 3 through FIG. 7, any other forms of fasteners, such as hook and loop fasteners, magnetic fasteners, metal clasps etc. may be employed, to connect the cover 3 to the base receptacle 1. Furthermore, the latch 4 is integrated into the rim 1a of the base receptacle 1, and the latch 4 is positioned offset from the first end 3a of the cover 3 around the rim 1a of the base receptacle 1. The positioning of the latch 4 makes sure the cover 3 completely seals the inner cavity 2, when the latch 4 engages the cover 3 to the base receptacle. According to the preferred embodiment, the actuation system 5 is operatively coupled in between the base receptacle 1 and the cover 3. As a result, the actuation system 5 transitions the smart compartment between a closed configuration and an opened configuration. It is an aim of the present invention to enable users to actuate opening of the smart compartment either manually (by pressing a button) or wirelessly, with the help of voice activation or any other automated wireless activation methods that are known to one of ordinary skill in the art. Further, voice activation techniques also enable a user to change the opening command according to the user's preference with the help of associated circuitry. Continuing with the preferred embodiment of the present invention, the HID 7 is integrated into the rim of the base receptacle 1, such that, a user may easily access the HID for performing the various operations associated with the HID 7. Preferably, the microcontroller 6 is mounted within the base receptacle 1, so that the associated circuitry and electrical components are placed in a closed safe location, and the smart compartment is aesthetically appealing. Further, the actuation system 5 and the HID 7 are electronically connected to the microcontroller 6, so that the microcontroller 6 is able to dictate the functions of the actuation system 5 and the HID 7.

As seen in FIG. 1 through FIG. 7, the smart compartment has the shape of a Police badge. Further, the present invention comprises weatherproof materials for the cover 3 and the base receptacle 1, such that the smart compartment may be used inside a vehicle in any location having extremes of temperatures. In some embodiments, the base receptacle 1 and the cover 3 are integrated into a dashboard of a vehicle, at a location behind the steering wheel. However, the present invention may comprise any other shape, size, materials, orientations, and/or locations, that are known to one of ordinary skill in the art, as long as they do not hinder the intended purpose of the present invention.

In an alternate embodiment, the present invention may also be positioned inside the dashboard by car manufacturers, such that, the cover 3 is aligned horizontally within an upper surface of the vehicle dashboard, as long as the intended purposes or the smart compartment are not hindered.

In the preferred embodiment of the present invention, a document securing sleeve 2a is positioned within the inner cavity 2. The document securing sleeve 2a enables to hold the various important documents intact within the inner cavity 2, without making them move around/get mixed up during the motion of the vehicle. Although the document securing sleeve 2a is shown as a paper holding sleeve, any other securing mechanisms, such as elastics, clips, etc. that are known to one of ordinary skill in the art may be employed to secure the documents within the inner cavity 2.

According to the present invention, the base receptacle 1 comprises a front panel 1b, a rear panel 1c, a first side panel 1d, a second side panel 1e, and a base board 1f, wherein the front panel 1b is positioned opposite to the rear panel 1c across the inner cavity, and the second side panel 1e is positioned opposite to the first side panel 1d, across the inner cavity 2. The various panels and base board if define the base structure of the base receptacle 1. Further, the thicknesses of the first and second side panels 1d and 1e decrease as they traverse from the front panel 1b towards the rear panel 1c of the base receptacle 1, so that the smart compartment compensates for any incline on the dash board and forms a horizontally aligned compartment over the dash board. However, it must be noted that, a compartment that has no variations in thickness, and which performs the intended functionalities of the smart compartment also falls under scope of the present invention.

Figure 5:
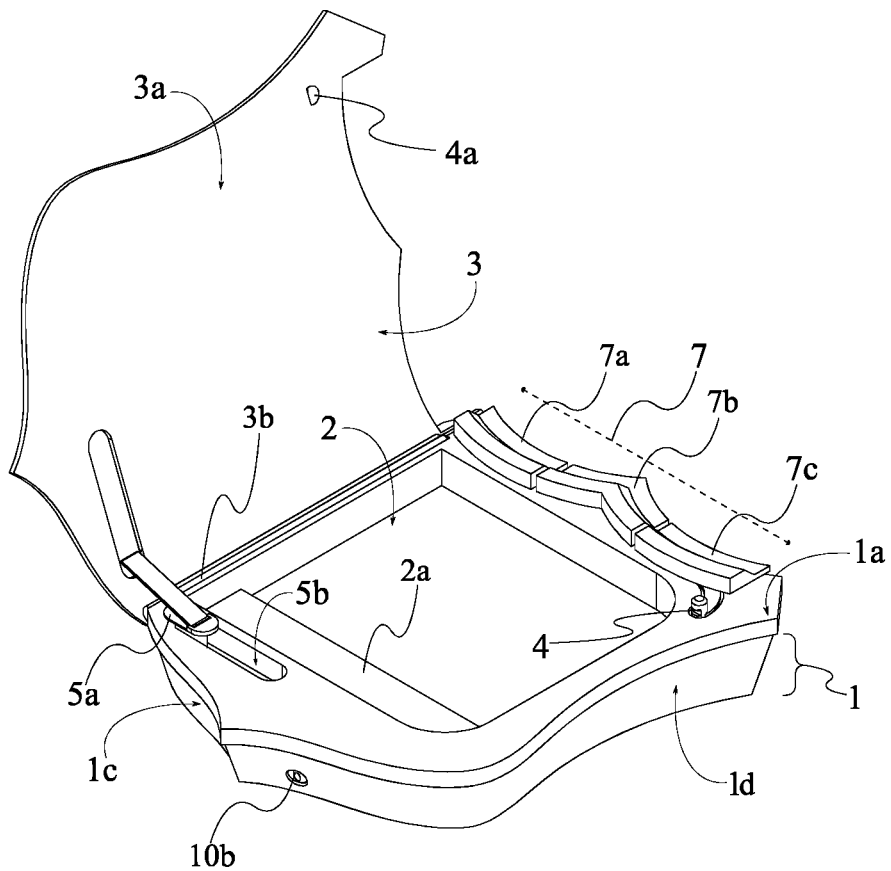
FIG. 5 is a top-front-left perspective view, wherein the present invention is shown open.
Figure 6:
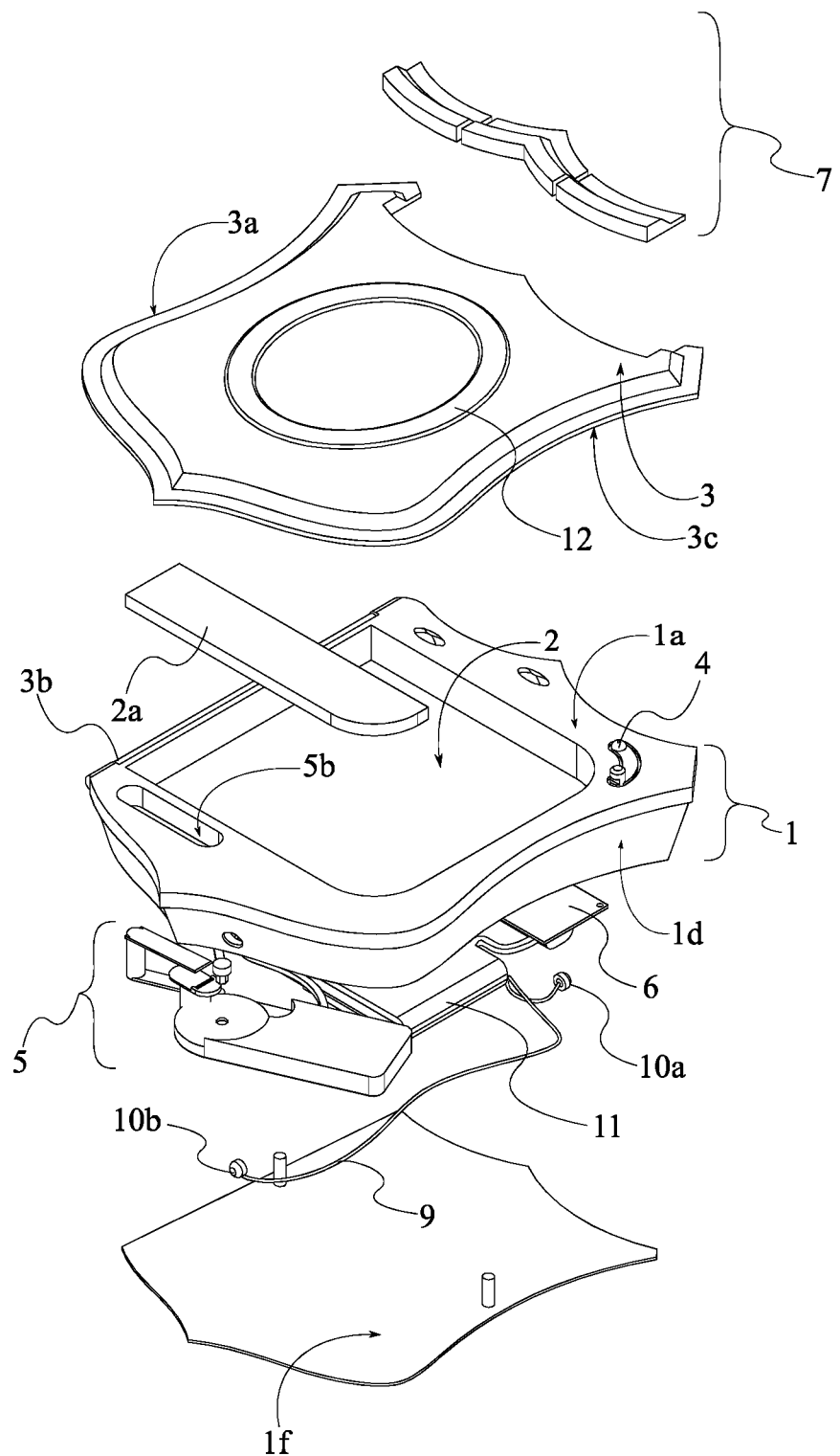
FIG. 6 is a top-front-left exploded view of the present invention.
Figure 7:
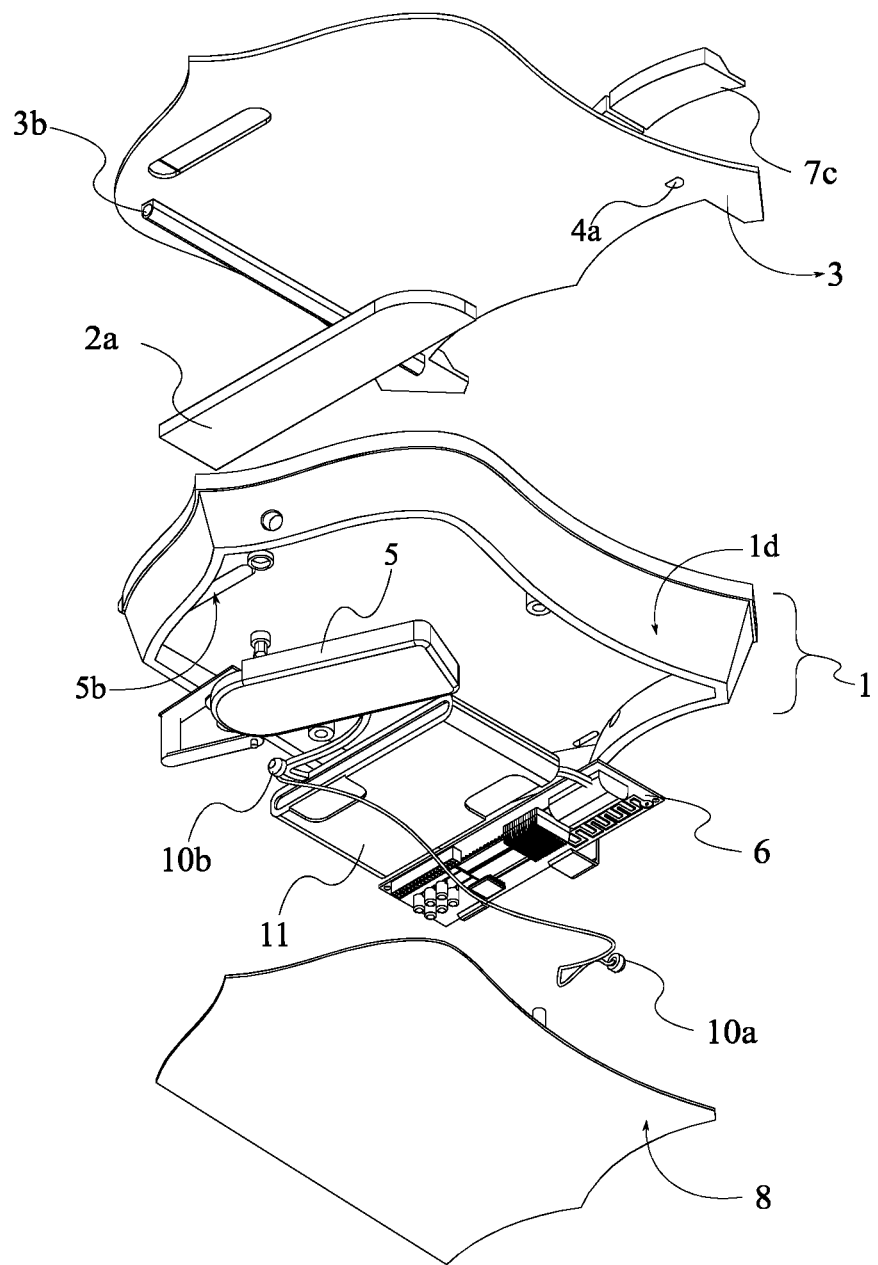
FIG. 7 is a bottom-rear-right exploded view of the present invention.

According to a preferred embodiment of the present invention, when the smart compartment is in the closed configuration, a second end 3c of the cover 3 is attached to the latch 4, and the cover 3 seals the inner cavity 2. Further, when the smart compartment is in the opened configuration, the second end 3c of the cover 3 is angularly offset from the latch 4. As seen in FIG. 5 through FIG. 7, the latch 4 is a cavity slider push latch (with a cavity 4a on the cover 3), however, any other latches or fastening systems including, but not limited to, magnetic latches, rotary latches, bidirectional linear latches, solenoid latches etc.) that are known to one of ordinary skill in the art may be employed, as long as the intended purpose of the present invention is not altered. Accordingly, the actuation system 5 comprises necessary circuitry and components that are sufficient for actuating the smart compartment between the closed and opened positions based on the actuation process involved. The actuation processes may include, but are not limited to manual actuation (with the help of a push button), fingerprint detection, and various wireless modes such as, voice activation, blue tooth activation, motion sensing, face recognition etc. Further, the actuation system 5 comprises multiple actuating components 5a, and holes 5b within the base receptacle 1 and the cover 3, for the smooth operation of the actuation system 5.

According to the preferred embodiment of the present invention, the HID 7 comprises a microphone 7a, wherein the microphone 7a is positioned adjacent to the front panel 1b of the base receptacle 1, so that the microphone 7a is proximate to the user and catches the audio signals from the user more efficiently. The microphone 7a is further be electronically connected to a voice sensor on the microcontroller 6. Further, the HID 7 comprises one or more push button switches 7b-7c, wherein the one of more pushbutton switches 7b-7c are positioned adjacent to the front panel 1b of the base receptacle 1. The push button switches 7b-7c are located on the smart compartment in such a way that the user can easily access the push button switches 7b-7c with his/her hand. The one of more push button switches 7b-7c may perform various operations, including, but are not limited to, turning the device power on/off, turning on/off a record process, start/stop playback, and perform various other operations based on the capacities and modules on the microcontroller 6.

Continuing with the preferred embodiment of the present invention, the smart compartment comprises a mounting fastener 8 for fastening the smart compartment to the dashboard of the vehicle. Accordingly, the mounting fastener 8 is positioned opposite to the inner cavity 2, across the base board 1f, and is connected to the bottom of the base receptacle 1. Preferably, the mounting fastener 8 is a flexible adhesive liner that conforms to the geometry of the dashboard. However, any other forms of mounting fasteners, such as clips, magnets, other forms of adhesives, hook and loop fasteners etc., that are known to one of ordinary skill in the art may be employed, for fastening the smart compartment on to the vehicle dashboard or on to any other surface on the vehicle, that is proximate to the driver.

Furthermore, the smart compartment further comprises a camera system 9. The camera system 9 comprises a first camera 10a, which is positioned adjacent to the front panel 1b of the base receptacle 1, and a second camera 10b, which is positioned adjacent to the rear panel 1c of the base receptacle 1. The positioning of the first camera 10a and the second camera 10b ensure comprehensive coverage in and around the entire vehicle. Thus, the first camera 10a, and the second camera 10b form a dual dash camera system which may be utilized for many security purposes. Such purposes include, but are not limited to, record vehicular incidents for preventing accidents, for evidence purposes, view live vehicle location, traffic conditions, calculate distance from certain sites, as part of a face recognition sensor, etc. Preferably, the HID 7, and the camera system 9 are electronically connected to the microcontroller 6.

As seen in FIG. 1 through FIG. 7, the base receptacle 1 provides a structural enclosure for all the different components of the present invention. Accordingly, the smart compartment comprises a power source 11, wherein the power source 11 is positioned within the base receptacle 1, in between the base board if and the inner cavity 2, so that the power source 11 is isolated from hazards in the external environment. Preferably, the power source 11 is a rechargeable battery, that is used to deliver electrical power to the microcontroller 6, the actuation system 5, and the camera system 9. However, any other source of power, or a combination of the following sources may be employed for the smooth functioning of the smart compartment. Examples of such power sources include, but are not limited to, Li ion batteries, magnetic power converters, solar power converters, power from the car battery etc. Further, the power source 11 may be connected to the one of more pushbutton switches 7b-7c, that enables to temporarily shut off and restore the power to the components of the smart compartment. Furthermore, the smart compartment may comprise an electrical terminal that allows the present invention to receive electrical power from an external power supply, and/or an electrical terminal that allows the present invention to send electrical power to an external electrical load.

Continuing with the preferred embodiment of the present invention, the microcontroller 6 is a processing device that interprets commands received from the HID 7 and uses these commands to manage the operation of the electrical components within the present invention. Further, the microcontroller 6 may comprise a wireless communication module, that connects and communicates with external devices via wireless data transmission protocols. Example standards of what the wireless communication module is capable of using includes, but are not limited to, Bluetooth, WI-FI, GSM, CDMA, ZigBee, etc.

According to the preferred embodiment of the present invention, the smart compartment comprises a visual output system 12, wherein the visual output system 12 is mounted adjacent to the cover 3, and wherein the visual output system 12 is positioned opposite to the inner cavity 2, across the cover 3. This positioning enables the user to easily view the information displayed on the visual output system 12. In the preferred embodiment of the present invention, the visual output system 12 is a plurality of light emitting diodes (LED) positioned on the exterior surface of the cover 3. In this embodiment, the visual output system 12 illuminates one or more LEDs to indicate the charge in a connected device, as well as the state of the current charging operation.

Further, the visual output system 12 is electronically connected to the microcontroller.

In an alternative embodiment of the present invention, the visual output system 12 is a digital display capable of rendering text and graphics to convey pertinent system information. In a second alternate embodiment of the present invention, the visual output system 12 is a display screen on any part of the base receptacle 1 or cover 3, that is capable of playing a recorded/saved video.

Although the invention has been explained in relation to its preferred embodiment, it is to be understood that many other possible modifications and variations can be made without departing from the spirit and scope of the invention.

What is claimed is:
1. A smart compartment comprising:
a base receptacle;
an inner cavity;
a cover;
a latch;
an actuation system;
a microcontroller;
a human interface device (HID);
the inner cavity traversing into the base receptacle;
a first end of the cover being hingedly connected to a rim of the base receptacle;
the cover being positioned over the inner cavity;
the latch being integrated into the rim of the base receptacle;
the latch being positioned offset from the first end of the cover around the rim of the base receptacle;
the actuation system being operatively coupled in between the base receptacle and the cover;
the actuation system transitioning the smart compartment in between a closed configuration and an opened configuration;
the HID being integrated into the rim of the base receptacle;
the microcontroller being mounted within the base receptacle;
the actuation system and the HID being electronically connected to the microcontroller;
a camera system;
the camera system comprising a first camera and a second camera;
the first camera being positioned adjacent to a front panel of the base receptacle;
the second camera being positioned adjacent to a rear panel of the base receptacle;
the base receptacle and the cover being configured to be integrated into a dashboard of a vehicle;
the cover being configured to be aligned horizontally with an upper surface of the dashboard of the vehicle; and
the base receptacle and the cover being configured to be positioned behind a steering wheel of the vehicle.
2. The smart compartment of claim 1, further comprising:
the base receptacle comprising the front panel, the rear panel, a first side panel, a second side panel, and a base board;
the front panel being positioned opposite to the rear panel across the inner cavity; and
the second side panel being positioned opposite to the first side panel, across the inner cavity.
3. The smart compartment of claim 2, wherein a thickness of the first side panel and a thickness of the second side panel decreasing from the front panel to the rear panel of the base receptacle.

4. The smart compartment of claim 1, wherein, the smart compartment is in the closed configuration:
a second end of the cover being attached to the latch; and
the cover sealing the inner cavity.

5. The smart compartment of claim 1, wherein, the smart compartment is in the opened configuration;
a second end of the cover being angularly offset from the latch.

6. The smart compartment of claim 1 comprising:
a mounting fastener;
the mounting fastener being connected adjacent to the base receptacle; and
the mounting fastener being positioned opposite to the inner cavity, across a base board.

7. The smart compartment of claim 6, wherein the mounting fastener is a flexible adhesive liner.

8. The smart compartment of claim 1 comprising:
the HID comprising a microphone; and
the microphone being positioned adjacent to a front panel of the base receptacle.

9. The smart compartment of claim 1, comprising:
the HID comprising one or more push-button switches; and
the push-button switches being positioned adjacent to a front panel of the base receptacle.

10. The smart compartment of claim 1 comprising:
a visual output system;
the visual output system being mounted adjacent to the cover; and
the visual output system being positioned opposite to the inner cavity, across the cover.

11. The smart compartment of claim 10, comprising:
the visual output system being electronically connected to the microcontroller.

12. The smart compartment of claim 1, wherein the cover and the base receptacle being composed of weatherproof materials.

13. The smart compartment of claim 1, comprising
a document securing sleeve; and
the document securing sleeve being positioned within the inner cavity of the base receptacle.

14. The smart compartment of claim 1, comprising;
a power source;
the power source being positioned within the base receptacle, in between a base board and the inner cavity; and
the power source being electronically connected to the microcontroller.

* * * * *